Figure 1:
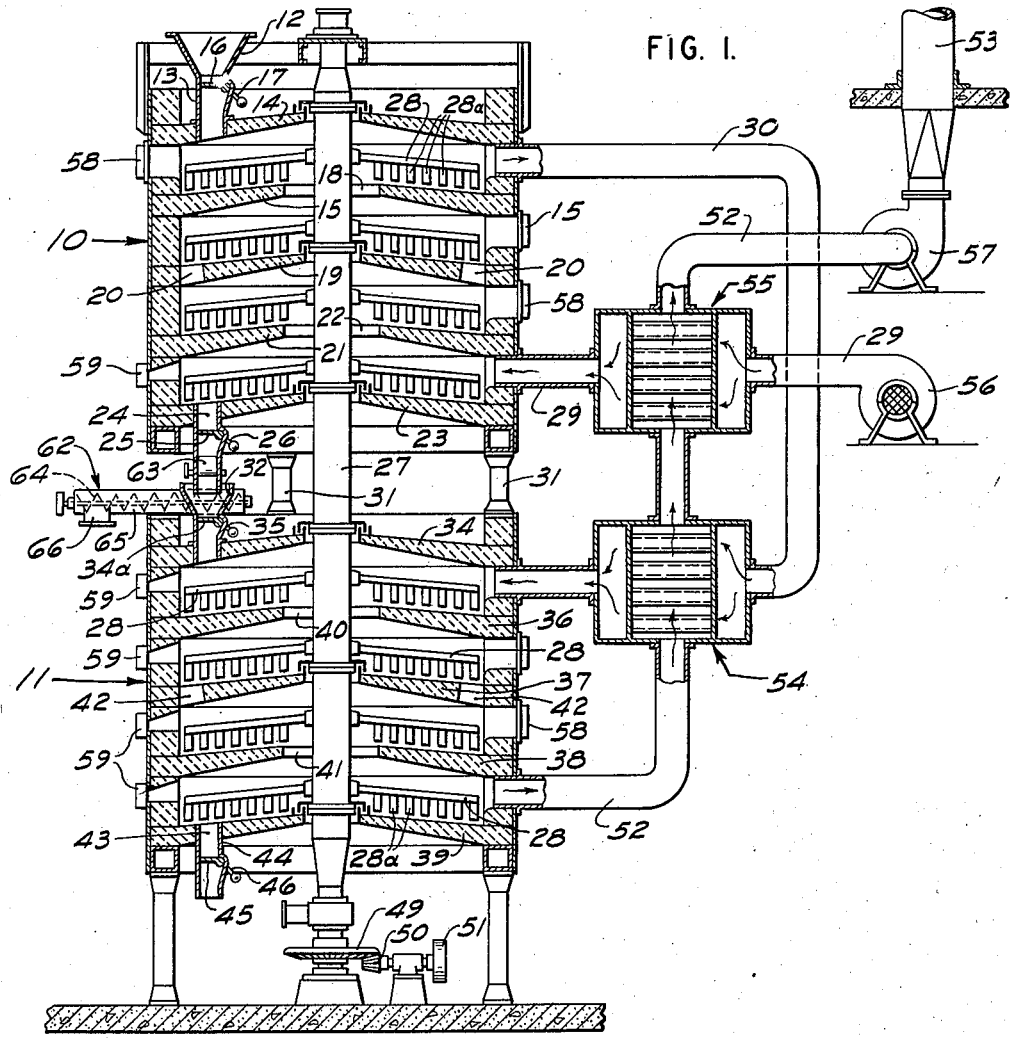

Aug. 30, 1938.  W. RAISCH  2,128,431
INCINERATION
Filed Oct. 10, 1936

INVENTOR
WILLIAM RAISCH
BY
his ATTORNEY

Patented Aug. 30, 1938

2,128,431

UNITED STATES PATENT OFFICE 2,128,431

INCINERATION

William Raisch, New York, N. Y., assignor to Underpinning & Foundation Co., Inc., New York, N. Y., a corporation of New York Application October 10, 1936, Serial No. 104,915

13 Claims. (Cl. 110—12)

The present invention relates to treatment of material involving a preliminary or drying stage in which moisture and volatile constituents are driven off as by subjecting the material to heat and contact with a stream of air preferably preheated, and a final incineration stage in which the dried material and the gases and vapors from the drying stage are burned substantially completely thus eliminating noxious odors. The invention is particularly adapted for the treatment of sewage solids, garbage and similar materials.

The principal objects of the invention are to provide a novel, advantageous and efficient form of apparatus and a novel process for effecting treatment of this kind.

An important feature of the apparatus resides in providing apparatus comprising two separate tiered multiple-hearth furnaces, one of which is used as a dryer and the other as a burner or incinerator. In each of these furnaces, the solid material under treatment is fed downwardly from hearth to hearth through outlets associated with the hearths, the material being fed in at the top of the furnace through a gas seal and the resulting material being discharged from the lowermost hearth through a corresponding gas seal. By thus forming the apparatus in two distinct parts, the drying and burning operations can be controlled largely independently of each other. Although the furnace may be arranged in different positions relative to each other, preferably the drying furnace is supported on the top of the burning furnace or incinerator with a substantial space between the lowermost hearth of the dryer furnace and the top of the burner furnace.

Other features relate to the use of combustion gases from the burning furnace, first to raise the temperature of the stream of air containing vaporized moisture and volatile matter passing from the dryer or drying furnace to the burning furnace where it may not only supply oxygen for burning but will be subjected to such high temperatures as to eliminate any noxious odors resulting from the drying operation, and second to preheat air introduced into the dryer or dryer furnace.

In carrying out the invention in a preferred manner, the dryer furnace is supported above the burning furnace by suitable means such as supporting legs and dry material discharged from the lowermost hearth of the dryer furnace is discharged into a hopper at the upper end of a chute passing through the top of the burner furnace and provided with a suitable gas seal. Each of the furnaces may be provided with a series of hearths comprising in alternation hearths with central discharge openings and with peripheral discharge openings, to which discharge openings or outlets the material at the various hearths is fed by suitable rabbling devices carried by a vertical shaft which may be common to both furnaces. Preferably, the stream of preheated air passes upwardly through the dryer furnace and takes up moisture and volatile matter and then is passed to the uppermost compartment of the burner furnace where it is passed downwardly and subjected to high enough temperatures to eliminate odors. The hot gases of combustion are discharged from the lowermost compartment.

The hot gases of combustion discharged from the burning furnace or incinerator may pass through the high temperature parts or sides of two heat exchangers, of which the first may be used to heat the air and vapors passing from the dryer to the burning furnace or incinerator and the second may be used to preheat air passing to the dryer.

Figure 2:
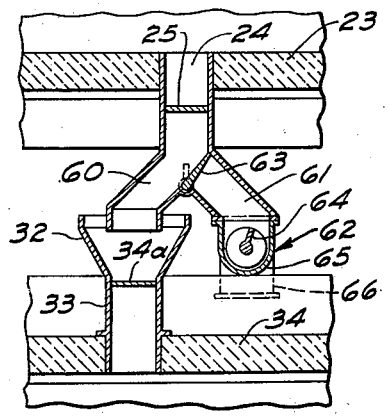

Other objects, features and advantages will appear upon consideration of the following description and of the drawing, in which Figure 1 is a sectional elevation of a furnace embodying a preferred form of the apparatus; and Figure 2 is a fragmentary view illustrating an arrangement for selectively passing the dried material to the burner furnace or out of the apparatus.

Referring to the drawing, the apparatus of the present invention may include a dryer or drying furnace 10 and a burning furnace 11, both of which are preferably of the tiered multiple-hearth type. The material to be dried and burned, such as dewatered sewage sludge or screenings, may be supplied to a hopper 12 at the upper end of a chute 13 passing through the top 14 into a compartment above the uppermost hearth 15 in the drying furnace 10. In order to prevent upward flow of gases and vapors through the chute 13 or downflow of air, the chute 13 may be provided with a pivoted door 16 normally held in closed position by a weighted arm 17. When a sufficient amount of the sewage solids has accumulated on the door 16 to overcome the action of the weighted arm 17, the door 16 will swing downwardly and permit the material to pass into the uppermost compartment and fall on the hearth 15, which may be provided with a relatively large central outlet 18.

Although the furnace 10 may comprise any suitable number of hearths, as illustrated there are four hearths in all, a hearth 19 below the hearth 15 and provided with one or more peripheral outlets 20 through which material may pass downwardly into the next lower compartment and be deposited on another hearth 21 which has a central outlet 22 through which the material is discharged on to the lowermost hearth 23 which serves as the bottom of the furnace. From the hearth 23 the material may be discharged through a chute or outlet 24 near the periphery of the hearth 23 and provided with a suitable door 25 preferably pivoted and normally supported in closed position by a weighted arm 26. Obviously the door 25 will open when a sufficient quantity of solid material has accumulated thereon and then closed to prevent upward movement of air or other gases therethrough.

To effect movement over the various hearths to their discharge openings use may be made of any suitable rabbling means preferably comprising a hollow vertical shaft 27 extending through the central portions of the various hearths and also through the top 14 of the drying furnace. The hollow shaft 27 is of much smaller radius than the central discharge openings 18 and 22, thereby permitting discharge of the material downwardly along the vertical shaft through the hearths 15 and 21 respectively. At the other hearths and the top 14 of the furnace, suitable gas seals are provided between the shaft 27 and these hearths.

Projecting radially from the shaft 27 over the various hearths are suitable rabbling devices comprising radial arms 28 carrying blades 28a so inclined at the various hearths as to gradually work the material towards the centers of the hearths 15 and 21 and outwardly toward the peripheries of hearths 19 and 23.

Preheated air may be introduced at the lowermost zone or compartment of the drying furnace through a duct 29 and the air containing vaporized moisture and other vaporizable material may be discharged from the upper part of the drying furnace through a pipe or duct 30.

The drying furnace 10 may be a substantial distance above the burning furnace 11 and may be supported on the top of the burning furnace by means of suitable legs 31. From the discharge chute or outlet 24 of the drying furnace 10, the dried material may be discharged into a hopper 32 at the upper end of a chute 33 passing through top 34 of the burning furnace 11, the downward flow of material through the chute 33 being controlled by any suitable means such as a door 34a in the chute 33 and normally held in closed position by a weighted arm 35.

The burning furnace 11 may have any suitable number of hearths, but, as illustrated, is provided with a plurality of hearths 36, 37, 38 and 39 of which the hearths 36 and 38 have central openings 40 and 41 and the hearths 37 and 39 have peripheral outlets 42 and 43. The lowermost hearth or bottom 39 of the burning furnace 11, as well as the top 34 are provided with central openings just large enough to permit the passage therethrough of an extension or portion of the hollow shaft 27. In order to feed the material downwardly through the burning furnace the material may be worked towards the centers of hearths 36 and 38 and towards the peripheries of hearths 37 and 39 being discharged finally from the hearth 39 through the outlet 43 and a chute 44 associated therewith and controlled by a pivoted door 45 normally held in raised position by a weighted arm 46.

The shaft 27 may extend through the burning furnace 11 and may be provided above the various hearths with rabbling devices comprising radial arms 28 and inclined plates or blades 28a so inclined as to move the material either inwardly to the central discharge outlets or outwardly toward the peripherally located outlets. The hollow shaft 27 may be driven in any suitable manner as by means of a bevel gear 49 mounted thereon, a bevel gear or pinion 50 meshing with the bevel gear 49, and a driving pulley 51 directly connected with the bevel gear 50 and driven from any suitable source of power.

The air and vapors discharged from the upper part of the drying furnace 10 through the duct 30 may be supplied to the uppermost compartment of the burning furnace 11 and be passed downwardly therethrough concurrently to the flow of solid material downwardly from zone to zone. From the lowermost part of the burning furnace 11 the hot gases of combustion may be passed through a pipe or duct 52 to a stack 53 either directly or indirectly. Preferably the hot gases of combustion discharged into the duct 52 are passed successively through the high temperature portions or sides of suitable heat exchangers 54 and 55 to the stack or chimney 53, the heat exchanger 54 being used to heat air and vapors passing through the duct 30 from the drying furnace to the burning furnace and the heat exchanger 55 being used to heat the air flowing through the duct or pipe 29 to the lowermost zone of the burning furnace 11. Air may be supplied to the pipe or duct 29 by means including a fan 56 arranged to force air through the lower temperature portion of the heat exchanger 54 into the duct. In order to assure proper draft through the duct 52 and the heat exchangers 54 and 55, a fan 57 may be provided between heat exchanger 55 and the stack 53. The drying and burning furnaces may be provided at the various compartments with doors 58 and burners 59 which may be used when required.

In order to pass the dried material in the chute 24 either to the hopper 32 or outside of the apparatus, the lower end of chute 24 may be divided into two branches 60 and 61, of which branch 60 discharges into the hopper 32 and branch 61 into a conveyor 62, which removes the dried material from the apparatus. The destination of the dried material may be determined by swinging to and fro a flap 63 pivoted at its lower part at the line of division between the two branches. The conveyor 62 may comprise a screw 64 working in a trough 65 provided with an outlet 66 at its lower side.

In operation, the material, such as sewage sludge dewatered by filtration, is supplied to the upper compartment of the tiered multiple hearth dryer 10 through the chute 13 and the door 16 which prevents any substantial volume of air or gases from passing in either direction through the chute and therefore acts as a gas seal. It should be understood that the gas pressure at the interior of the furnace may be relatively low and that some air may be admitted into the furnace when the door 16 opens. In passing through the dryer 10 from hearth to hearth, the material is maintained in a relatively thin layer on each hearth and in the rabbling action is kept agitated, thus promoting drying of the material by the passage, over the upper surfaces of the layers, of preheated air admitted into the dryer through the duct 29. The dried material is finally discharged from the bottom of the dryer 10 and transferred to the burning furnace or incinerator 11, and the air cooled by its passage through the dryer and containing moisture in vapor form and other vapors is also transferred to the burning furnace 11.

The dried material thus charged into the burning furnace 11 may be sufficient to sustain combustion. Otherwise it may be necessary to use some of the burners 59 or to use auxiliary fuel in other ways as by mixing it with the dried material. Although the draft may be arranged differently, it is preferably upward in the dryer and downward in the burning furnace. Thus the air and vapors from the upper part of the dryer may be passed into the upper part of the furnace 11 and the gases of combustion withdrawn from the lower part thereof. The gases of combustion may be used to preheat the air supplied to the dryer, and also to heat the air and vapors passing from the dryer to the burning furnace. As disclosed, the hot gases are passed first through the heat exchanger or interchanger 54 to preheat the air and vapors passing from the upper part of the dryer to the upper part of the burning furnace, and then the heat interchanger or exchanger 55 to heat the air passing to the drying furnace 10. Any noxious odors developed in the drying operation will be eliminated in the burning furnace.

When desired the flap 63 may be placed in a position to prevent passage of the dried material to the burning furnace and to cause such dried material to pass to the conveyor 62 for discharge from the apparatus.

It should be understood that various changes may be made and that certain features may be used without others, without departing from the true scope and spirit of the invention.

Having thus described my invention, I claim:

1. In combination, a multiple-hearth dryer furnace and a multiple-hearth burning furnace, each furnace having vertically spaced hearths with outlets arranged to enable material to pass downwardly from hearth to hearth, means including a gas seal for introducing material to be treated into the top of each furnace, means including a second gas seal to discharge material from each furnace, means for passing material from the outlet of the dryer furnace to the inlet of the burning furnace, two heat exchangers, means for discharging hot gases of combustion from the lower part of the burning furnace through the higher temperature portions of said heat exchangers, means for passing air through the lower temperature side of one of said heat exchangers to the lower part of the dryer furnace, and means for passing air and vapors from the upper part of the dryer furnace through the lower temperature side of the other heat exchanger to the upper part of the burning furnace.

2. In combination, a multiple-hearth dryer furnace and a multiple-hearth burning furnace, each furnace having vertically spaced hearths with outlets arranged to enable material to be passed downwardly from hearth to hearth, means including a gas seal for introducing material to be treated into the top of each furnace, means including a second gas seal to discharge material from each furnace, means for passing material from the outlet of the dryer furnace to the inlet of the burning furnace, two heat exchangers, means for discharging hot gases of combustion from the burning furnace through the higher temperature portions of said heat exchangers in series, means for passing air through the lower temperature side of the second of said heat exchangers to the bottom of the dryer furnace, and means for passing air and vapors from the top of the dryer furnace through the higher temperature side of the other heat exchanger to the top part of the burning furnace.

3. In combination, a multiple-hearth dryer furnace and a multiple-hearth burning furnace arranged coaxially with the dryer furnace above the burning furnace, each furnace having vertically spaced hearths with outlets arranged to enable material to pass downwardly from hearth to hearth, means including a gas seal for introducing material to be treated into the top of the furnace, means including a second gas seal to discharge material from the furnace, means for passing material from the outlet of the dryer to the inlet of the burning furnace, rabbling means including a shaft passing axially through both of said furnaces and rabbling devices projecting from the shaft over the hearths to work the material to the corresponding outlets, means for discharging hot gases of combustion from the burning furnace, means using said hot gases for raising the temperature of air and vapors discharged from the dryer furnace and passing the same into the burning furnace, and means for preheating air by a second use of said hot gases and introducing it into the dryer furnace.

4. In combination, a multiple-hearth burning furnace and a multiple-hearth drying furnace arranged above the burning furnace and spaced therefrom, each furnace having vertically spaced hearths with outlets arranged to enable material to pass downwardly from hearth to hearth, means including a gas seal for introducing material into the top of the furnace and means including a second gas seal for discharging material from the furnace, means for selectively directing dried material from the drying furnace to the material-introducing means for the burning furnace or to a point outside of the burning furnace, means for discharging hot gases of combustion from the burning furnace, means for supplying air to the drying furnace, means for passing air and vapors from the drying furnace to the burning furnace, and means for utilizing said hot gases to heat the air and vapors passing from the drying furnaces to the burning furnace.

5. In combination, a multiple-hearth dryer furnace and a multiple-hearth burning furnace beneath the same, each furnace having vertically spaced hearths with outlets arranged to enable material to be passed downwardly from hearth to hearth, means including a gas seal for introducing material to be treated into the top of each furnace, means including a second gas seal for discharging material from each furnace, the dried material discharging by gravity from the dryer furnace to the burning furnace, a heat exchanger, means for discharging hot gases of combustion from the burning furnace through the higher temperature portion of the heat exchanger, means for passing air through the lower temperature side of the heat exchanger to the dryer furnace, and means for passing the air and vapors taken up thereby from the dryer furnace to the burning furnace.

6. In combination, a multiple-hearth dryer furnace and a multiple-hearth burning furnace beneath the same, each furnace having vertically spaced hearths with outlets arranged to enable material to be passed downwardly from hearth to hearth, means including a gas seal for introducing material to be treated into the top of each furnace, means including a second gas seal for discharging material from each furnace, the dried material discharging by gravity from the dryer furnace to the burning furnace, a heat exchanger, means for discharging hot gases of combustion from the burning furnace through the higher temperature portion of the heat exchanger, means for passing air through the lower temperature side of the heat exchanger to the lower part of the dryer furnace, and means for passing the air and vapors taken up thereby from the upper part of the dryer furnace to the burning furnace.

7. In combination, a multiple-hearth dryer furnace and a multiple-hearth burning furnace beneath the same, each furnace having vertically spaced hearths with outlets arranged to enable material to be passed downwardly from hearth to hearth, means including a gas seal for introducing material to be treated into the top of each furnace, means including a second gas seal for discharging material from each furnace, the dried material discharging by gravity from the dryer furnace to the burning furnace, a heat exchanger, means for discharging hot gases of combustion from the lower part of the burning furnace through the higher temperature portion of the heat exchanger, means for passing air through the lower temperature side of the heat exchanger to the dryer furnace, and means for passing the air and vapors taken up thereby, from the dryer furnace to the upper part of the burning furnace.

8. In combination, a multiple-hearth dryer furnace and a multiple-hearth burning furnace beneath the same, each furnace having vertically spaced hearths with outlets arranged to enable material to be passed downwardly from hearth to hearth, means including a gas seal for introducing material to be treated into the top of each furnace, means including a second gas seal for discharging material from each furnace, the dried material discharging by gravity from the dryer furnace to the burning furnace, a heat exchanger, means for discharging hot gases of combustion from the lower part of the burning furnace through the higher temperature portion of the heat exchanger, means for passing air through the lower temperature side of the heat exchanger to the lower part of the dryer furnace, and means for passing the air and vapors taken up thereby from the upper part of the dryer furnace to the upper part of the burning furnace.

9. In combination a multiple-hearth dryer furnace and a multiple-hearth burning furnace, each furnace having vertically spaced hearths with outlets arranged to enable the material to be passed downwardly from hearth to hearth, means including a gas seal for introducing material to be treated into the top of each furnace, means including a second gas seal to discharge material from each furnace, means for passing material from the outlet of the dryer furnace to the inlet of the burning furnace, two heat exchangers, means for discharging hot gases of combustion from the burning furnace through higher temperature portions of said heat exchangers, means for passing air through the lower temperature side of one of said heat exchangers to the dryer furnace, and means for passing air and vapors from the dryer furnace through the lower temperature side of the other heat exchanger to the burning furnace.

10. In combination a multiple-hearth dryer furnace and a multiple-hearth burning furnace, each furnace having vertically spaced hearths with outlets arranged to enable the material to be passed downwardly from hearth to hearth, means including a gas seal for introducing material to be treated into the top of each furnace, means including a second gas seal to discharge material from each furnace, means for passing material from the outlet of the dryer furnace to the inlet of the burning furnace, two heat exchangers, means for discharging hot gases of combustion from the burning furnace through the higher temperature portions of said heat exchangers in series, means for passing air through the lower temperature side of the first of said heat exchangers to the dryer furnace, and means for passing air and vapors from the dryer furnace through the lower temperature side of the other heat exchanger to the burning furnace.

11. In combination a multiple-hearth dryer furnace and a multiple-hearth burning furnace arranged coaxially with the dryer furnace above the burning furnace, each furnace having vertically spaced hearths with outlets arranged to enable the material to be passed downwardly from hearth to hearth, means including a gas seal for introducing material to be treated into the top of each furnace, means including a second gas seal to discharge material from each furnace, means for passing material from the outlet of the dryer furnace to the inlet of the burning furnace, rabbling means including a shaft passing axially through both of said furnaces and rabbling devices projecting from the shaft, means for discharging hot gases of combustion from the burning furnace, means for preheating air and introducing it into the dryer furnace, and means for raising the temperature of air and vapors discharged from the dryer furnace and passing the same into the burning furnace.

12. In combination a multiple-hearth burning furnace and a multiple-hearth dryer furnace arranged above the burning furnace and supported thereon by means of an interposed openwork structure, each furnace having vertically spaced hearths having outlets arranged to enable the material to be passed downwardly from hearth to hearth, means including a gas seal for introducing material to be treated into the top of each furnace, means including a second gas seal to discharge material from each furnace, the outlet of the dryer being above the inlet of the burning furnace to cause material from the dryer furnace outlet to drop into the burner furnace inlet, means for discharging hot gases of combustion from the burning furnace, means for supplying air to the dryer furnace, means for passing air and vapors from the dryer furnace to the burning furnace, and means for utilizing said hot gases to preheat the air passing to the dryer furnace and to heat the air and vapors passing from the dryer furnace to the burning furnace.

13. In combination a multiple-hearth dryer furnace and a multiple-hearth burning furnace spaced below the same, each furnace having vertically spaced hearths with outlets arranged to enable the material to be passed downwardly from hearth to hearth, means including a closure for introducing material to be treated into the top of each furnace, means including a closure to discharge material from each furnace, means for passing material from the outlet of the dryer furnace to the inlet of the burning furnace, a heat exchanger, means for discharging hot gases of combustion from the burning furnace through the higher temperature portion of said heat exchanger, means for supplying air to the dryer furnace, and means for passing air and vapors from the dryer furnace through the lower temperature side of said heat exchanger to the burning furnace.

WILLIAM RAISCH.